(12) United States Patent
Sakamoto

(10) Patent No.: US 9,273,973 B2
(45) Date of Patent: Mar. 1, 2016

(54) DEVICE CONTROL APPARATUS, AND SELF-PROPELLING ELECTRONIC DEVICE

(71) Applicant: Sharp Kabushiki Kaisha, Osaka-shi, Osaka (JP)

(72) Inventor: Jitsuo Sakamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/419,044

(22) PCT Filed: Sep. 25, 2013

(86) PCT No.: PCT/JP2013/075905
§ 371 (c)(1),
(2) Date: Feb. 2, 2015

(87) PCT Pub. No.: WO2014/065071
PCT Pub. Date: May 1, 2014

(65) Prior Publication Data
US 2015/0168166 A1    Jun. 18, 2015

(30) Foreign Application Priority Data
Oct. 23, 2012   (JP) ................... 2012-234136

(51) Int. Cl.
*A47L 9/00*   (2006.01)
*G05D 1/02*   (2006.01)
*G01C 21/34*   (2006.01)

(52) U.S. Cl.
CPC .............. *G01C 21/34* (2013.01); *G05D 1/0214* (2013.01); *A47L 2201/04* (2013.01); *G05D 2201/0215* (2013.01)

(58) Field of Classification Search
CPC .............. A47L 9/00; A47L 9/28; G05D 1/02; H04L 12/2816; Y01S 901/01
USPC ........... 701/400, 24, 25, 409, 23, 28; 700/245
See application file for complete search history.

(56) References Cited

U.S. PATENT DOCUMENTS 8,989,946 B2 * 3/2015 Anderson ............ G05D 1/0219 701/1
2005/0278088 A1 * 12/2005 Thorner ................ B60Q 9/005 701/28
2007/0282484 A1 * 12/2007 Chung ................. G05D 1/0214 700/245

FOREIGN PATENT DOCUMENTS

| JP | 61-240306 A | 10/1986 |
| JP | 2002-085305 A | 3/2002 |
| JP | 2007-323402 A | 12/2007 |
| JP | 2011-056123 A | 3/2011 |
| JP | 2013-230294 A | 11/2013 |

OTHER PUBLICATIONS

Official Communication issued in International Patent Application No. PCT/JP2013/075905, mailed on Dec. 10, 2013.

* cited by examiner

*Primary Examiner* — Tan Q Nguyen
(74) *Attorney, Agent, or Firm* — Keating & Bennett, LLP

(57) ABSTRACT

An object of the present invention is to find a route on which a self-propelling electronic device preferentially runs a region which (i) is designated by a user and (ii) the self-propelling electronic device ran less frequently. A server device (80) includes: a preferential running region specifying section (812) which specifies a predetermined number of regions in a running region included in a predetermined space which predetermined number of regions a self-propelling electronic device (20) has most recently run a fewest number or fewer numbers of times, the running region being a region which the self-propelling electronic device (20) can run and which is determined by a user's operation; a route searching section (813) which searches for a running route on which the self-propelling electronic device (20) runs at least once all of the predetermined number of regions in the running region, the predetermined number of regions being specified by the preferential running region specifying section (812); and an instruction issuing section (814) which issues, to the self-propelling electronic device (20), a control instruction for causing the self-propelling electronic device (20) to run the predetermined space along the running route searched for by the route searching section (813).

5 Claims, 11 Drawing Sheets

FIG.5

| 3 | 4 | 4 | 4 | 4 | 4 | 4 | 4 | | | |
|---|---|---|---|---|---|---|---|---|---|---|
| 3 | 6 | 6 | 6 | 6 | 6 | 6 | 5 | | | |
| | 6 | 6 | 6 | 6 | 6 | 6 | 6 | 4 | 4 | 4 | 1 |
| | 6 | 6 | 6 | 4 | 4 | 4 | 4 | 6 | 6 | 6 | |
| | 6 | 6 | 6 | | | | | 6 | 6 | 6 | |
| | 6 | 6 | 6 | | | | | 6 | 6 | 6 | |
| 3 | 7 | 7 | 6 | | | | | 6 | 6 | 6 | 1 |
| 3 | 7 | 7 | 4 | 2 | 2 | 2 | 2 | 6 | 6 | 6 | 2 |
| 3 | | 3 | 3 | 3 | 3 | 3 | 3 | 5 | 5 | 5 | 2 |

(a)

(b)

US 9,273,973 B2

DEVICE CONTROL APPARATUS, AND SELF-PROPELLING ELECTRONIC DEVICE

TECHNICAL FIELD

The present invention relates to, for example, a device controlling apparatus which controls running of a self-propelling electronic device.

BACKGROUND ART

Recently, development of self-propelling electronic devices has advanced. Among the self-propelling electronic devices, particularly, a self-propelling vacuum cleaner which cleans while carrying out self-propulsion has started being in widespread use among ordinary households. A technique has been developed for finding an optimal running route which the self-propelling electronic devices efficiently run.

For example, Patent Literature 1 discloses a technique for, without necessitating any operation for entering a complicated running route, causing a self-propelling electronic device to (i) flexibly select, from a plurality of cleaning regions, a cleaning region to be cleaned and (ii) clean the selected cleaning region.

Patent Literature 2 discloses a technique for distinguishing a temporal obstacle from an obstacle which always exists.

CITATION LIST

Patent Literatures

Patent Literature 1
Japanese Patent Application Publication, Tokukai, No. 2002-85305 (Publication Date: Mar. 26, 2002)
Patent Literature 2
Japanese Patent Application Publication, Tokukai, No. 2007-323402 (Publication Date: Dec. 13, 2007)

SUMMARY OF INVENTION

Technical Problem

Patent Literature 1 describes specifying a current location on the basis of image information, and cleaning a selected cleaning region in accordance with how to clean the selected cleaning region while carrying out self-propulsion. However, Patent Literature 1 does not mention searching for an efficient cleaning route in consideration of a route which a self-propelling electronic device ran.

The technique of Patent Literature 2 is a mere technique for avoiding an obstacle, though it is a technique for causing a self-propelling electronic device to efficiently run.

These techniques of Patent Literatures 1 and 2 do not search for a running route on the basis of a running region which a self-propelling electronic device can run, the running region being determined by a user. The techniques of Patent Literatures 1 and 2 cannot cause the self-propelling electronic device to efficiently run only a region determined by the user as a region which the user wants the self-propelling electronic device to run.

The present invention was made in view of the problems, and an object of the present invention is to provide, for example, a device controlling apparatus which searches for a route in which a self-propelling electronic device preferentially runs a region designated by a user which region the self-propelling electronic device has run less frequently.

Solution to Problem

In order to attain the object, a device controlling apparatus of an aspect of the present invention is configured to be a device controlling apparatus which controls running of a self-propelling electronic device that runs at least one predetermined space, including: a running region information storing section which stores running region information indicative of a running region that represents a region which the self-propelling electronic device can run in the at least one predetermined space, the running region being determined by a user's operation; a route history storing section which stores a history of a route which the self-propelling electronic device ran while carrying out a predetermined operation; a running region specifying section which specifies, from a predetermined number of routes having been most recently stored in the route history storing section, a predetermined number of regions in the running region which predetermined number of regions the self-propelling electronic device has most recently run a fewest number or fewer numbers of times; a route searching section which searches for a running route on which the self-propelling electronic device runs at least once all of the predetermined number of regions in the running region indicated by the running region information stored in the running region information storing section, the predetermined number of regions being specified by the running region specifying section; and an instruction issuing section which (i) creates a control instruction for causing the self-propelling electronic device to run and carry out the predetermined operation in the at least one predetermined space along the running route searched for by the route searching section, and (ii) issues the control instruction to the self-propelling electronic device.

Advantageous Effects of Invention

The device controlling apparatus of the aspect of the present invention can search for a running route which the self-propelling electronic device runs at least once all of a predetermined number of regions which the self-propelling electronic device has most recently run a fewest number or fewer numbers of times, and can cause the self-propelling electronic device to run a predetermined space along the running route and to carry out an operation. This brings about an effect of causing the self-propelling electronic device to efficiently carry out the operation in the predetermined space. The device controlling apparatus further can search for the running route with use of a running region determined by a user's operation. It is therefore possible to cause the self-propelling electronic device to preferentially run a region which (i) a user wants the self-propelling electronic device to run and (ii) the self-propelling electronic device has run less frequently.

BRIEF DESCRIPTION OF DRAWINGS

FIG. 5 is a diagram schematically illustrating an example of divided regions into which a running region which the self-propelling electronic device can run is divided, the running region being included in a layout image of a floor of a space which the self-propelling electronic device runs.

DESCRIPTION OF EMBODIMENTS

The following description will discuss an embodiment of the present invention with reference to FIGS. 1 through 11.

[Configuration of System]

Figure 2:
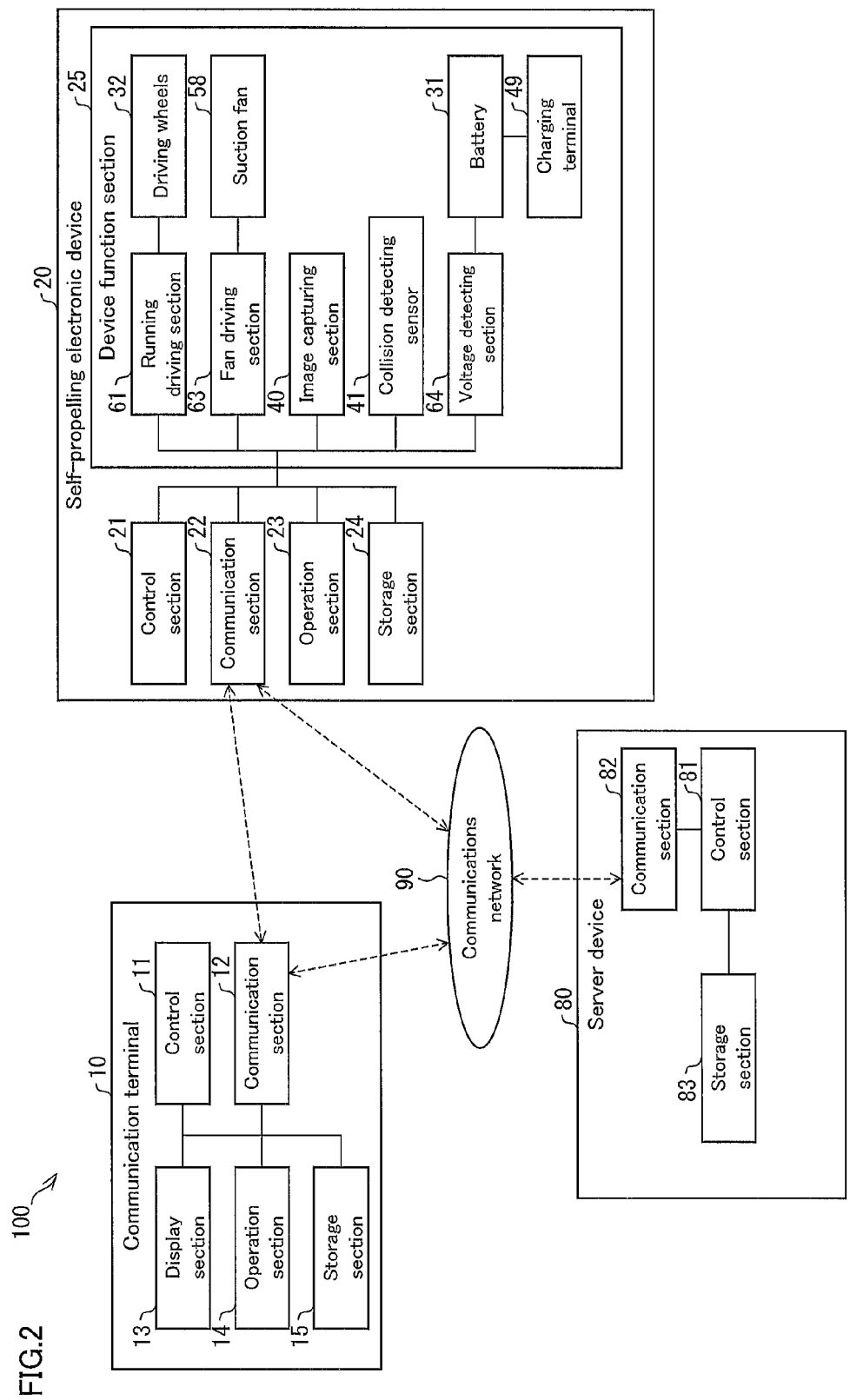
FIG. 2 is a diagram schematically illustrating a configuration of the device control system of an embodiment of the present invention.
Figure 3:
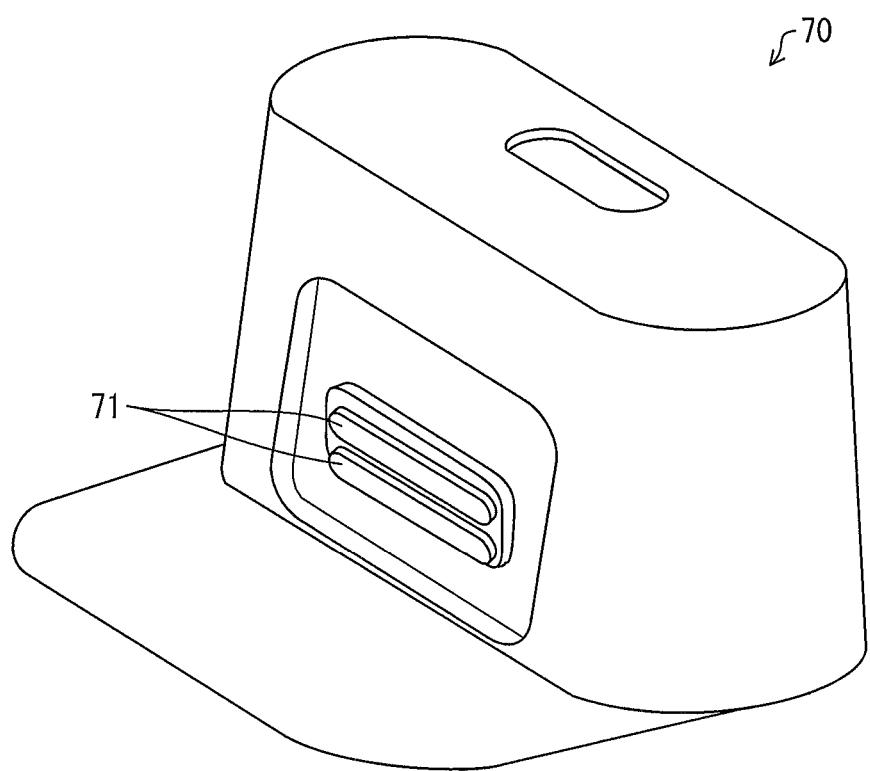
FIG. 3 is a diagram schematically illustrating a charging station for electrically charging a self-propelling electronic device included in the device control system illustrated in FIG. 2.

FIG. 2 is a diagram schematically illustrating a configuration of a device control system 100 of the present embodiment. As illustrated in FIG. 2, the device control system 100 includes a communication terminal 10, a self-propelling electronic device 20, and a server device (device controlling apparatus) 80. The communication terminal 10, the self-propelling electronic device 20, and the server device 80 are connected to one another so as to be communicable with one another via a communications network 90. The communication terminal 10 and the self-propelling electronic device 20 have respective functions of communicating with each other without the communications network 90. Note that the number of self-propelling electronic devices 20 included in the device control system 100 is not limited to one. The device control system 100 may include a plurality of self-propelling electronic devices 20. Similarly, the number of communication terminals 10 included in the device control system 100 is neither limited to one. The device control system 100 may include a plurality of communication terminals 10.

[Configuration of Communication Terminal]

As illustrated in FIG. 2, the communication terminal 10 includes a control section 11, a communication section 12, a display section 13, an operation section 14, and a storage section 15. Note that a configuration of the communication terminal 10 is not particularly limited provided that the communication terminal 10 has functions of the sections. Examples of the communication terminal 10 include a smart phone, a tablet terminal, a mobile phone, a PDA (Personal Digital Assistance), a personal computer, and a portable game machine.

The control section 11 is control means for controlling operations of the sections of the communication terminal 10. The control section 11 is constituted by a computer device that includes, for example, (i) a computation section such as a CPU (Central Processing Unit) or a dedicated-purpose processor and (ii) a storage section such as a RAM (Random Access Memory), a ROM (Read Only Memory) or an HDD (Hard Disk Drive) (none of which is illustrated in FIG. 2). The control section 11 controls the operations of the sections of the communication terminal 10 by (i) reading, from the storage section, various pieces of information and programs for executing various controls and (ii) executing those programs.

The communication section 12 is communication means having (i) a long-distance communication function of communicating with a remote device via the communications network 90 and (ii) a short-distance communication function of communicating with a device which is present in a communicable range (e.g., inside a facility where the communication terminal 10 and the device are present).

Examples of the communications network 90 via which the communication section 12 carries out the long-distance communication function include the Internet, telephone line network, mobile communications network, CATV communications network, and satellite communications network.

Examples of the short-distance communication function include (i) a communication function of a WiFi (Registered Trademark) device which mutually connects wireless devices with use of a wireless LAN standard, i.e., IEEE802.11 (IEEE802.11a or IEEE802.11b), (ii) a communication function based on a wireless LAN standard other than IEEE802.11, (iii) a communication function based on a short-distance wireless communication standard such as Bluetooth (Registered Trademark) or ZigBee (Registered Trademark), and (iv) an infrared communication function. Note that, in a communications network of the present application, the long-distance communication function and the short-distance communication function are utilized.

The display section 13 displays, in response to an instruction from the control section 11, various pieces of information to be given to a user. A configuration of the display section 13 is not particularly limited. Examples of the display section 13 include a liquid crystal display panel, an organic EL (electroluminescence) panel, and a plasma display panel.

The operation section 14 receives an operation entered by a user, and notifies the control section 11 of the operation. A configuration of the operation section 14 is not particularly limited. Various conventionally publicly-known operation entering means can be employed as the operation section 14. Note that the present embodiment employs a touch panel which serves as the display section 13 and the operation section 14.

The storage section 15 is storage means for storing various pieces of information used by the communication terminal 10. A configuration of the storage section 15 is not particularly limited. Conventionally publicly-known storage means can be employed as the storage section 15.

[Configuration of Self-Propelling Electronic Device]

The self-propelling electronic device 20 is a self-propelling electronic device having (i) a function of carrying out a predetermined operation in accordance with an operation entered by a user via an operation section (operation section 23 to be later described) included in the self-propelling electronic device 20 and (ii) a function of carrying out a predetermined operation in accordance with a control instruction received from the server device 80 or the communication terminal 10. The present embodiment will describe a case where (i) the self-propelling electronic device 20 is a self-propelling vacuum cleaner and (ii) the predetermined operations are "cleaning". However, the self-propelling electronic device 20 is not limited to the self-propelling vacuum cleaner. The self-propelling electronic device 20 may alternatively be, for example, an air cleaning device, an image capturing device, or various robots (such as a security guard robot, a housework assistance robot, and an animal-shaped robot).

As illustrated in FIG. 2, the self-propelling electronic device 20 includes a control section 21, a communication section 22, the operation section 23, a storage section 24, and a device function section 25.

The control section 21 is control means for controlling operations of the sections of the self-propelling electronic device 20. The control section 21 is constituted by a computer device that includes, for example, (i) a computation section such as a CPU or a dedicated-purpose processor and (ii) a storage section such as a RAM, a ROM or an HDD (none of which is illustrated in FIG. 2). The control section 21 controls the operations of the sections of the self-propelling electronic device 20 by (i) reading, from the storage section, various pieces of information and programs for executing various controls and (ii) executing those programs.

The communication section 22 is communication means having (i) a function of communicating with a remote device via the communications network 90 (long-distance communication function) and (ii) a function of communicating with a device which is present in a communicable range (e.g., inside a facility where the self-propelling electronic device 20 and the device are present) (short-distance communication function). A communication section similar to the communication section 12 included in the communication terminal 10 can be employed as the communication section 22.

The operation section 23 receives an instruction entered by a user, and notifies the control section 21 of the instruction. A configuration of the operation section 23 is not particularly limited. The operation section 23 may be constituted by key operation buttons, a touch panel, or a combination of the key operation buttons and the touch panel.

The storage section 24 is storage means for storing various pieces of information used by the self-propelling electronic device 20. A configuration of the storage section 24 is not particularly limited. For example, various RAMs, ROMs, and HDDs can be employed as the storage section 24.

The device function section 25 carries out functions of the self-propelling electronic device 20 in accordance with an instruction from the control section 21. Specifically, the device function section 25 of the present embodiment carries out functions such as a running function, a cleaning function, and an image capturing function.

In order to carry out these functions, the device function section 25 includes a running driving section 61, driving wheels 32, a fan driving section 63, a suction fan 58, a voltage detecting section 64, a battery 31, charging terminals 49, an image capturing section 40, and a collision detecting sensor 41.

When a user's operation or a control instruction instructs the self-propelling electronic device 20 to clean, the battery 31 supplies electric power to the running driving section 61 and the fan driving section 63 so that the running driving section 61 and the fan driving section 63 are driven. Driving of the running driving section 61 rotates the driving wheels 32, whereby the self-propelling electronic device 20 runs a floor of a predetermined space. Driving of the fan driving section 63 drives the suction fan 58, whereby the self-propelling electronic device 20 sucks, through a suction port (not illustrated), an air flow including dust on the floor.

The battery 31 is an electric power supply source which supplies electric power to the whole self-propelling electronic device 20. A configuration of the battery 31 is not particularly limited. Examples of the battery 31 include a lead battery cell, a nickel hydrogen battery, a lithium ion battery, and a capacitor. Note that the battery 31 is preferably a high-capacity rechargeable battery which can be repetitively charged and discharged.

In order to charge the battery 31, the self-propelling electronic device 20 returns to a charging station 70 (see FIG. 3), and the charging terminals 49 come into contact with power supply terminals 71 (see FIG. 3) with which the charging station 70 is provided, so that the battery 31 is charged. The voltage detecting section 64 detects a voltage of the battery 31, and finds, on the basis of the detected voltage, how much the battery 31 is to be charged.

The charging station 70 is normally placed so that a back surface (opposite to a side where the power supply terminals 71 are provided) of the charging station 70 faces an internal side wall S of a room. The charging station 70 supplies electric power to the self-propelling electronic device 20 via the power supply terminals 71, the electric power being supplied from a commercial power supply. The charging station 70 is placed at a predetermined position (home position) (reference position) on the floor, and does not move.

The image capturing section 40 captures an image (a moving image and/or a static image) of the surroundings of the self-propelling electronic device 20. A configuration of the image capturing section 40 is not particularly limited. Publicly-known image capturing means can be employed as the image capturing section 40. For example, image capturing means that includes an optical lens, a color filter, and a CCD (Charge Coupled Device) as a light receiving element may be employed as the image capturing section 40.

The collision detecting sensor 41 detects a collision of the self-propelling electronic device 20 with an obstacle.

[Configuration of Server Device]

As illustrated in FIG. 2, the server device 80 includes a control section 81, a communication section 82, and a storage section 83.

The control section 81 is control means for controlling operations of the sections of the server device 80. The control section 81 is constituted by a computer device that includes, for example, (i) a computation section such as a CPU or a dedicated-purpose processor and (ii) a storage section such as a RAM, a ROM or an HDD (none of which is illustrated in FIG. 2). The control section 81 controls the operations of the sections of the server device 80 by (i) reading, from the storage section, various pieces of information and programs for executing various controls and (ii) executing those programs. A configuration of the control section 81 will be later described in detail.

The communication section 82 is communication means for communicating with a device via the communications network 90. The above-described examples of the communications network 90 can be employed.

The storage section 83 is storage means for storing various pieces of information used by the server device 80, such as (1) a control program executed by the control section 81, (2) an OS program executed by the control section 81, (3) an application program for causing the control section 81 to execute various functions of the server device 80, and (4) various pieces of data which are read for execution of the application program. A configuration of the storage section 83 is not particularly limited. For example, various RAMs, ROMs and HDDs can be employed as the storage section 83.

Note that the storage section 83 is not necessarily included in the server device 80. The storage section 83 may be configured to be connected to the server device 80 as (i) an external storage device which can be attached to or detached from the server device 80 or (ii) an external storage device which communicates with the server device 80 via the communications network 90.

[Configuration of Storage Section of Server Device]

Figure 1:
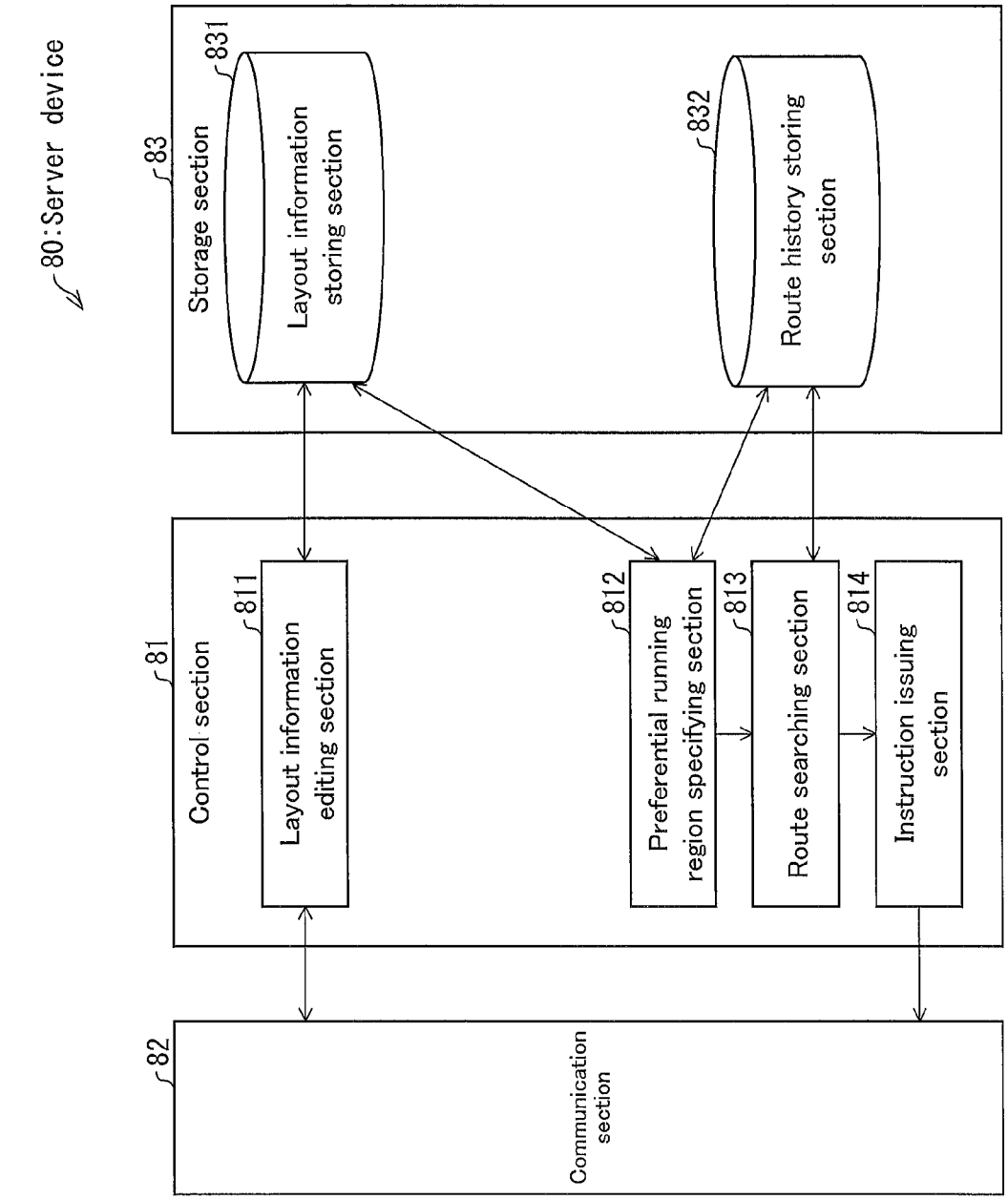
FIG. 1 is a block diagram illustrating a configuration of a server device included in a device control system illustrated in FIG. 2.

The storage section 83 will be described below in detail with reference to FIG. 1. FIG. 1 is a block diagram illustrating the configuration of the server device 80. As illustrated in FIG. 1, the storage section 83 includes a layout information storing section (running region information storing section) 831 and a route history storing section 832.

The layout information storing section 831 stores layout information indicative of a layout (room arrangement) of a predetermined space (hereinafter referred to as a space P) of, e.g., a room, a house, or a facility where the self-propelling electronic device 20 runs. The layout information includes at least (1) layout outline information indicative of the shape and size of a floor of the space P and (2) running region information indicative of (i) a running region of the floor of the space P which running region the self-propelling electronic device 20 can run and (ii) a non-running region of the floor of the space P which non-running region the self-propelling electronic device 20 cannot run (or a non-running region of the floor of the space P which non-running region a user does not want the self-propelling electronic device 20 to run). The layout information may further include (3) arrangement information indicative of an arrangement state where objects such as furniture and home electric appliances are arranged in the space P.

The route history storing section 832 stores a history of a route which the self-propelling electronic device 20 ran while cleaning. That is, the route history storing section 832 stores at least one piece of route information indicative of the route which the self-propelling electronic device 20 ran while cleaning. Note that the at least one piece of route information is correlated with the date and time when the at least one piece of route information was stored in the route history storing section 832. It is possible to specify route information having been most recently stored in the route history storing section 832, by referring to the date and time when the route information has been stored in the route history storing section 832.

[Configuration of Control Section of Server Device]

The control section 81 will be described below in detail with reference to FIG. 1. As illustrated in FIG. 1, the control section 81 includes at least a layout information editing section 811, a preferential running region specifying section (running region specifying section) 812, a route searching section 813, and an instruction issuing section 814.

The layout information editing section 811 causes the display section 13 of the communication terminal 10 to display an interface screen on which layout information is edited. The layout information editing section 811 further causes the display section 13 of the communication terminal 10 to display an interface screen on which generated layout information stored in the layout information storing section 831 is edited.

The layout information editing section 811 causes the layout information storing section 831 to store layout information edited in accordance with an operation entered via the operation section 14 of the communication terminal 10.

Note that it is preferable that (i) the layout information editing section 811 cause the display section 13 to display, on an interface screen, an layout image of an outline of a floor of a space P, the floor including a running region which the self-propelling electronic device 20 can run and a non-running region which the self-propelling electronic device 20 cannot run and (ii) the layout information editing section 811 provide an interface for editing the layout image. In this case, a user can edit positions, sizes and shapes of the running region and the non-running region via the operation section 14 of the communication terminal 10 while viewing the layout image displayed by the display section 13 of the communication terminal 10. The non-running region is typically a region where an object is placed. The running region is typically a region where no object is placed. Even a region where an object is placed can be determined to a running region which the self-propelling electronic device 20 can run provided that the self-propelling electronic device 20 can run below the object. Hereinafter, for simplification of description, assume that a non-running region represents a region where an object is placed, and a running region represents a region where no object is placed.

Figure 4:
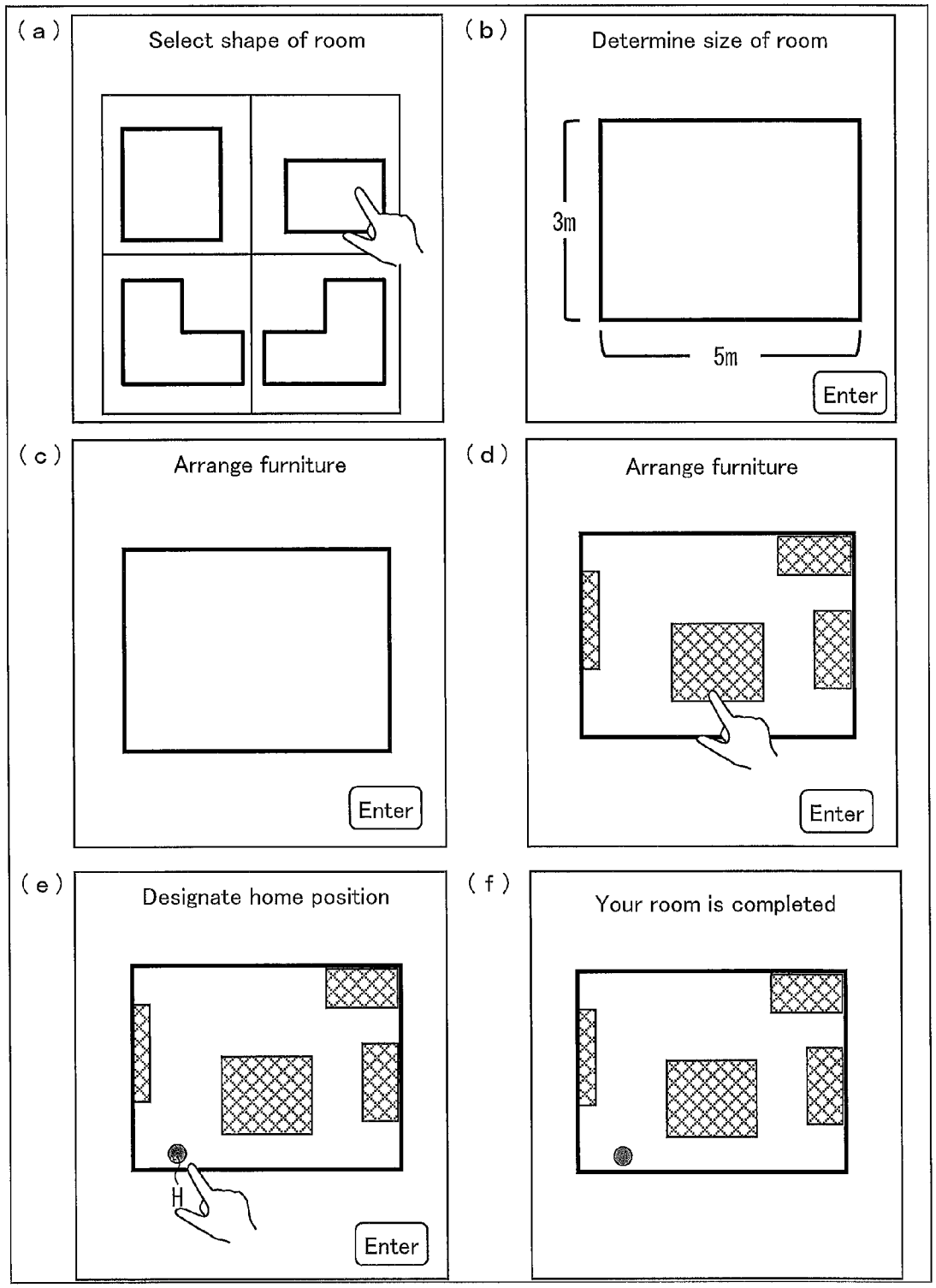
FIG. 4 is a diagram schematically illustrating an example of an interface screen displayed by a display section of a communication terminal included in the device control system illustrated in FIG. 2.

An example of an interface screen will be described below with reference to FIG. 4. FIG. 4 is a diagram schematically illustrating an example of an interface screen which the layout information editing section 811 causes the display section 13 of the communication terminal 10 to display.

(a) of FIG. 4 illustrates a screen on which a user selects a shape of an outline of a floor of a space P from candidate shapes. When the user selects the shape of the outline of the floor of the space P on the screen illustrated in (a) of FIG. 4, the screen illustrated in (a) of FIG. 4 changes to a screen illustrated in (b) of FIG. 4. On the screen illustrated in (b) of FIG. 4, the user determines a size of the selected outline. When the user determines the size on the screen illustrated in (b) of FIG. 4, the screen illustrated in (b) of FIG. 4 changes to a screen illustrated in (c) of FIG. 4. On the screen illustrated in (c) of FIG. 4, the user arranges an object in the space P and edits a position, size and shape of the object. (d) of FIG. 4 is a screen illustrating a state where objects are arranged. Note that hatched regions represent the objects. As illustrated in (e) of FIG. 4, the user designates a home position (a position H illustrated in (e) of FIG. 4). These user's operations complete layout information (see (f) of FIG. 4).

The preferential running region specifying section 812 will be described below with reference to FIG. 1. The preferential running region specifying section 812 specifies, from a predetermined number of running routes (e.g., three running routes) having been most recently stored in the route history storing section 832, a predetermined number of running regions which the self-propelling electronic device 20 has most recently run a fewest number or fewer numbers of times (e.g., ten running regions which the self-propelling electronic device 20 has most recently run a fewest number or fewer numbers of times). Specifically, the preferential running region specifying section 812 counts the number of times the self-propelling electronic device 20 ran each of ones of regions into which a running region is divided (hereinafter referred to as divided regions), the ones being included in the predetermined number of running routes having been most recently stored in the route history storing section 832. The preferential running region specifying section 812 then specifies a predetermined number of divided regions of the ones which predetermined number of divided regions the self-propelling electronic device 20 has run a fewest number or fewer numbers of times (the predetermined number of divided regions includes a divided region which the self-propelling electronic device 20 has not run yet).

The size and shape of a divided region are not particularly limited. It is, however, preferable that the size of the divided region is equal to that of an outline of the self-propelling electronic device 20 so that the preferential running region specifying section 812 correctly counts the number of running for each divided region.

"A predetermined number of running routes", "a predetermined number of running regions", and "a predetermined number of divided regions" may be determined in advance, or may be variable in accordance with a user's operation.

The preferential running region specifying section 812 specifies a divided region before the route searching section 813 searches for a route.

How the preferential running region specifying section 812 specifies divided regions will be described below with reference to FIG. 5. FIG. 5 is a diagram schematically illustrating an example of divided regions into which a running region is divided, the running region being included in a layout image of a floor of a space P. In FIG. 5, a numeral (1 to 6) assigned to each of the divided regions represents an example of the number of running for the each of the divided regions specified from a predetermined number of running routes having been most recently stored in the route history storing section 832. In this case, the preferential running region specifying section 812 specifies, as divided regions which the self-propelling electronic device 20 has most recently run fewer numbers of times, for example, eight divided regions enclosed by dashed lines (divided regions which the self-propelling electronic device 20 ran once or twice).

The route searching section 813 will be described later with reference to FIG. 1. The route searching section 813 searches for a running route on which the self-propelling electronic device 20 runs at least once all of the divided regions which are (i) included in the running region included in layout information stored in the layout information storing section 831 and (ii) specified by the preferential running region specifying section 812.

The route searching section 813 then causes the route history storing section 832 to store route information indicative of the running route searched for by the route searching section 813. Note that a route searching method is not particularly limited. A method generally known as this kind of route searching method may be employed.

A start point of the running route is not particularly limited. It is, however, preferable that the start point be a home position so that the self-propelling electronic device 20 can accurately run along the running route. In a case where the start point is the home position, the layout information preferably includes position information of the home position. In this case, the home position is preferably determined by a user's operation for designating a predetermined position on the layout image displayed on an interface screen (early described).

Further, a current position of the self-propelling electronic device 20 may be employed as a start position of the running route. In a case where the self-propelling electronic device 20 can specify the current position as a relative position relative to the home position, the route searching section 813 specifies the current position on a layout from (i) the position information of the home position included in the layout information and (ii) the relative position obtained from the self-propelling electronic device 20, and the route searching section 813 then searches for the running route in which the specified current position is the start point.

Typical examples of a trigger for causing the route searching section 813 to start searching for a running route include (1) when the route searching section 813 receives, from the communication terminal 10, an instruction for causing the self-propelling electronic device 20 to start cleaning, (2) when the route searching section 813 is notified by the self-propelling electronic device 20 that the self-propelling electronic device 20 starts cleaning in response to, e.g., activation of a timer, and (3) when, in response to, e.g., activation of a timer, the server device 80 instructs the self-propelling electronic device 20 to start cleaning. However, the trigger is not limited to these typical examples.

The instruction issuing section 814 creates a control instruction for causing the self-propelling electronic device 20 to run and clean in the space P along the running route searched for by the route searching section 813. The instruction issuing section 814 then issues the created control instruction to the self-propelling electronic device 20. Upon reception of the control instruction, the self-propelling electronic device 20 runs and cleans in the space P in accordance with the control instruction.

[Flow of Processes]

Figure 6:
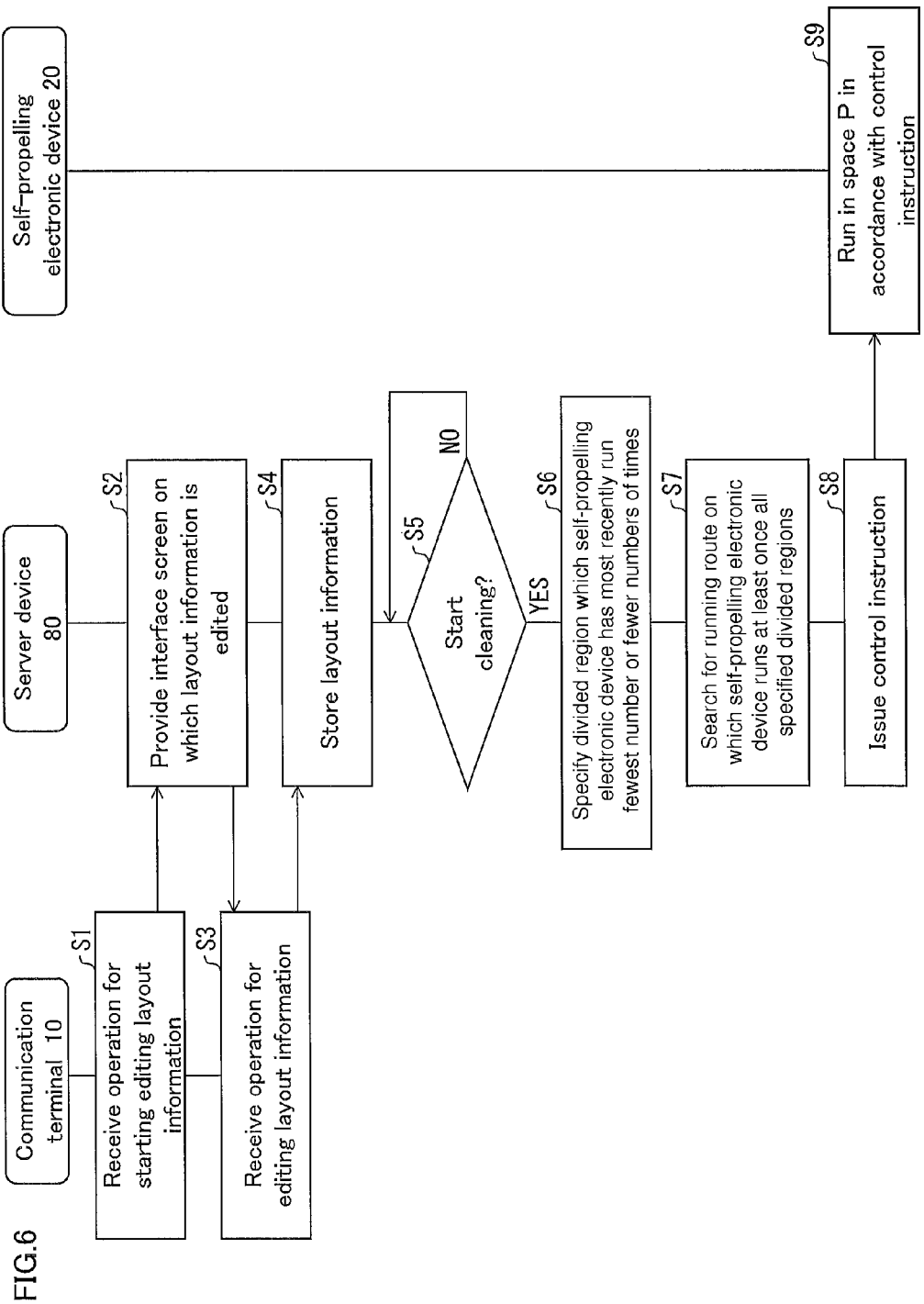
FIG. 6 is a flowchart illustrating a flow of processes carried out in the device control system illustrated in FIG. 2.

A flow of processes carried out in the device control system 100 will be described below with reference to FIG. 6. FIG. 6 is a flowchart illustrating the flow of the processes carried out in the device control system 100.

When the operation section 14 of the communication terminal 10 receives an operation for starting editing layout information (S1), the layout information editing section 811 of the server device 80 provides the communication terminal 10 with an interface screen on which the layout information is edited (S2), and the display section 13 of the communication terminal 10 displays the interface screen. When the operation section 14 of the communication terminal 10 receives an operation for editing the layout information (S3), the layout information editing section 811 of the server device 80 causes the layout information storing section 831 to store the layout information (S4).

When the self-propelling electronic device 20 starts cleaning (YES in S5), the preferential running region specifying section 812 of the server device 80 specifies, from a predetermined number of running routes having been most recently stored in the route history storing section 832, a predetermined number of divided regions in a running region which predetermined number of divided regions the self-propelling electronic device 20 has most recently run a fewest number or fewer numbers of times (S6).

The route searching section 813 of the server device searches for a running route on which the self-propelling electronic device 20 runs at least once all of the divided regions which are (i) included in the running region included in layout information stored in the layout information storing section 831 and (ii) specified by the preferential running region specifying section 812 (S7).

The instruction issuing section 814 of the server device 80 creates a control instruction for causing the self-propelling electronic device 20 to run and clean in a space P along the running route searched for by the route searching section 813. The instruction issuing section 814 then issues the created control instruction to the self-propelling electronic device 20 (S8).

Upon reception of the control instruction, the self-propelling electronic device 20 runs and cleans in the space P in accordance with the control instruction (S9).

[Modification 1]

It is desirable to carefully clean a region of a running region which region is easily contaminated or has been already contaminated. It is therefore desirable that a user can designate a region which is carefully cleaned by the self-propelling electronic device 20.

The running region may include at least one carefully-cleaned region (hereinafter referred to as a priority region F) designated by a user's operation. In this case, it is preferable to configure the layout information editing section 811 so that a user can further designate the priority region F on an interface screen on which layout information is edited. (a) of FIG.

7 is a diagram schematically illustrating a screen example on which a user designates a priority region F by designating a given range of a running region.

Figure 7:
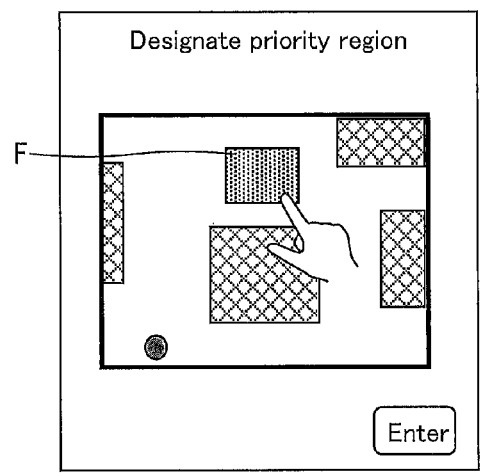
FIG. 7 is a diagram schematically illustrating a priority region included in the layout image of the floor of the space which the self-propelling electronic device runs.
Figure 7:
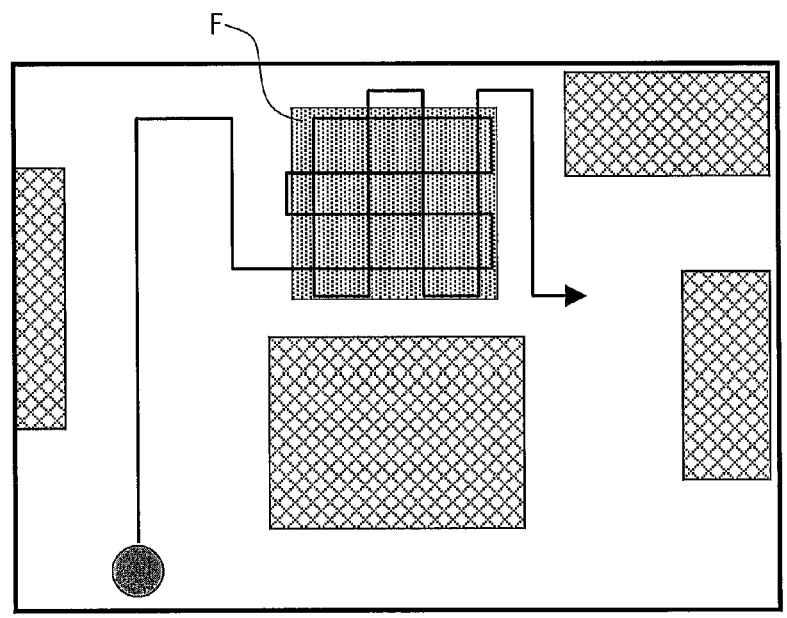

The route searching section 813 searches for a running route on which the self-propelling electronic device 20 runs all over the priority region F, in addition to the above-described configuration. This can cause the self-propelling electronic device 20 to carefully clean the priority region F. (b) of FIG. 7 is a diagram schematically illustrating an example of the running route on which the self-propelling electronic device 20 runs all over the priority region F. In (b) of FIG. 7, an arrow line represents the running route.

Note that the self-propelling electronic device 20 may "run all over the priority region F" by (i) running the same position in the priority region F more than once or (ii) running the priority region F at a speed lower than a normal speed.

[Modification 2]

As has been described, layout information is editable on an interface screen, and the position, size and shape of a running region are editable. In a case where a running region is edited, a region appears in the edited running region, the region being not included in the running region which has not been edited but is included in the edited region (the region is hereinafter referred to as an appearance region N). For example, in a case where a user shifts an object in a space P to make changes to the space P, a region where the object has been placed before the object is shifted is an appearance region N.

An appearance region N may be uncontaminated because an object has been placed before the object is shifted, or may be contaminated because the appearance region N has not been cleaned for a while. It is therefore desirable that a user can determine whether or not the appearance region N should be carefully cleaned. That is, a running region which the self-propelling electronic device 20 can run may include at least one carefully-cleaned appearance region N designated by a user's operation.

Figure 8:
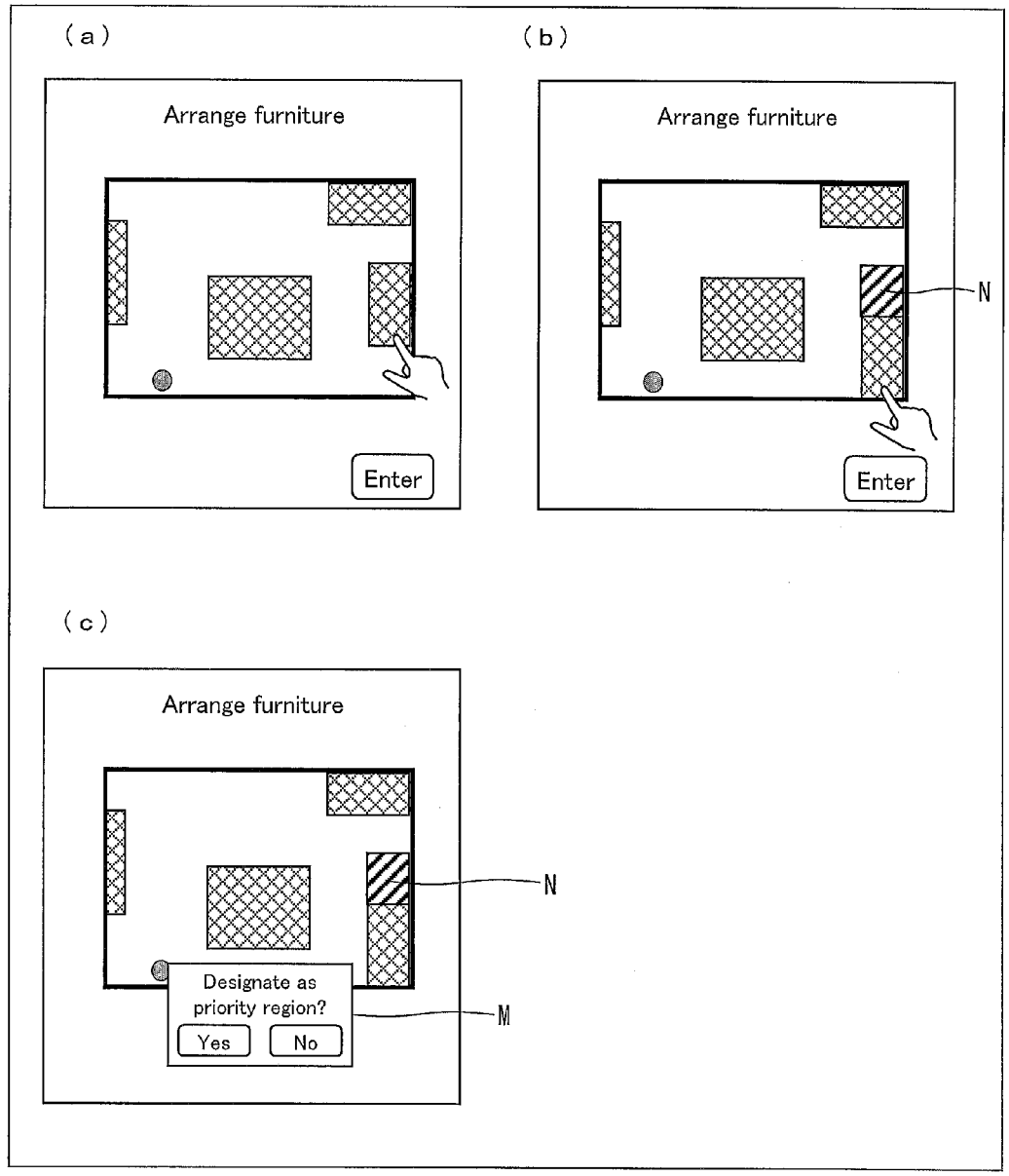
FIG. 8 is a diagram schematically illustrating an example of an interface screen displayed by the display section of the communication terminal included in the device control system illustrated in FIG. 2.

An appearance region N will be described below with reference to FIG. 8. FIG. 8 is a diagram schematically illustrating an example of an interface screen which the layout information editing section 811 causes the display section 13 of the communication terminal 10 to display. In a case where a user's operation shifts downward an object arranged in a layout image illustrated in (a) of FIG. 8 (see (b) of FIG. 8), a hatched region is an appearance region N. In this case, the layout information editing section 811 causes the display section 13 to display a dialogue M where a user determines whether or not the appearance region N should be carefully cleaned (see (c) of FIG. 8). When the user determines that the appearance region N should be carefully cleaned, the layout information editing section 811 causes the layout information storing section 831 to store layout information that includes the appearance region N as a carefully-cleaned region.

The route searching section 813 searches for a running route on which the self-propelling electronic device 20 runs all over the appearance region N determined to be carefully cleaned, in addition to the above-described configuration. This can cause the self-propelling electronic device 20 to carefully clean the appearance region N determined to be carefully cleaned.

Note that the self-propelling electronic device 20 may "run all over the appearance region N" by (i) running the same position in the appearance region N more than once or (ii) running the appearance region N at a speed lower than a normal speed.

[Modification 3]

In a case where the self-propelling electronic device 20 cannot run along a running route because an obstacle is present on the running route, the self-propelling electronic device 20 preferably runs the running route while avoiding the obstacle. In order that the self-propelling electronic device 20 avoids the obstacle, for example, a running route where the obstacle is not present is newly searched for.

Specifically, when the collision detecting sensor 41 of the self-propelling electronic device 20 detects a collision of the self-propelling electronic device 20 with an obstacle, the control section 21 of the self-propelling electronic device 20 transmits, to the server device 80, position information indicative of a position (relative position) of the self-propelling electronic device 20 at which position the self-propelling electronic device 20 collided with the obstacle.

Upon reception of the position information, the route searching section 813 of the server device 80 newly searches for a running route which does not include a position of the obstacle.

The instruction issuing section 814 of the server device 80 creates a control instruction for causing the self-propelling electronic device 20 to run a space P along the running route which has been newly searched for by the route searching section 813. The instruction issuing section 814 then issues the created control instruction to the self-propelling electronic device 20. As such, the server device 80 instructs the self-propelling electronic device 20 to run the space P without colliding with the obstacle.

[Modification 4]

In a case where it is found that an obstacle is present on a running route, it is preferable that a running route where the obstacle is not present be searched for next time and after.

Figure 9:
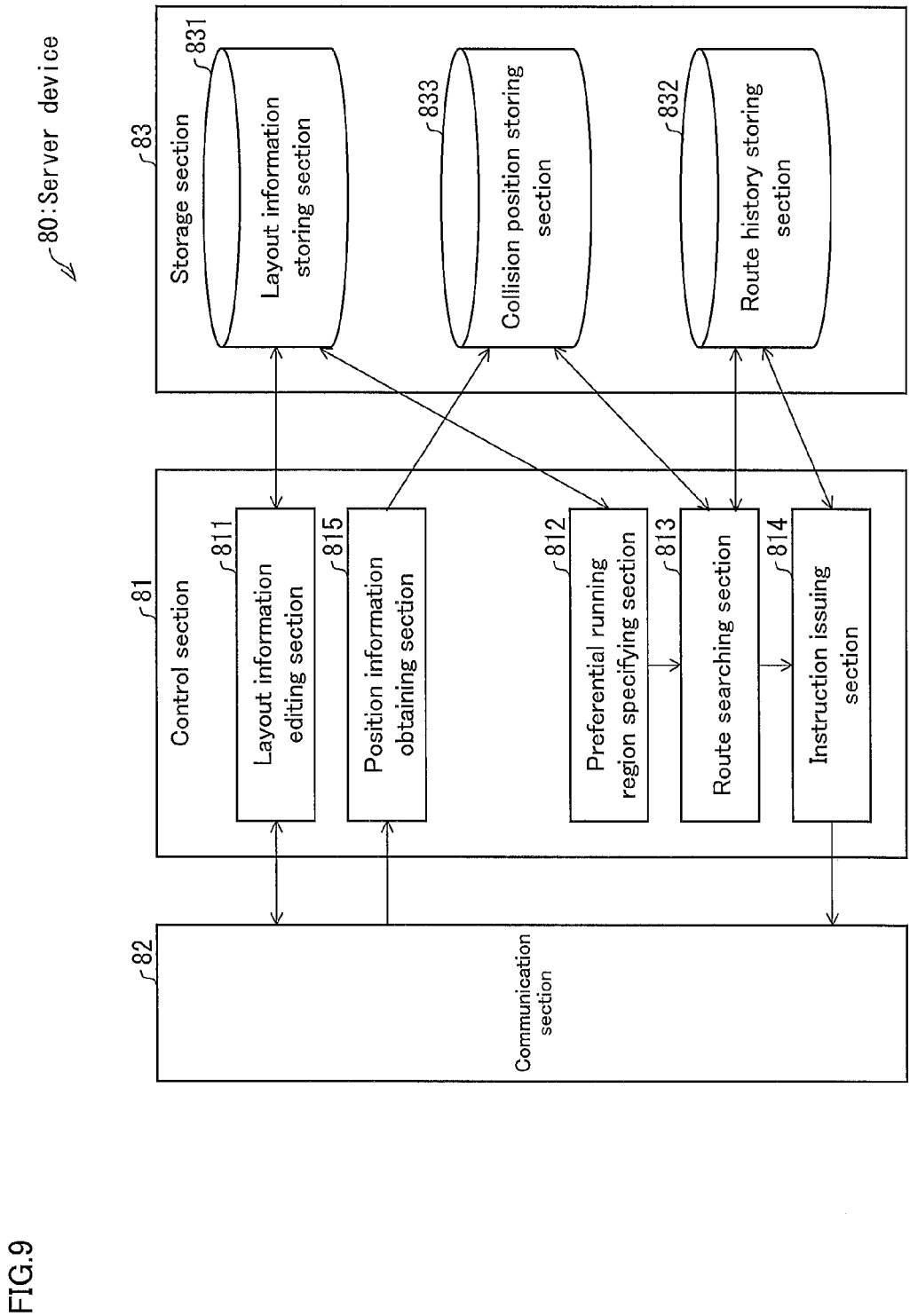
FIG. 9 is a block diagram illustrating a configuration of a modification of the server device included in the device control system illustrated in FIG. 2.

A configuration of a server device 80 of the present modification will be described below with reference to FIG. 9. FIG. 9 is a block diagram illustrating the configuration of the server device 80 of the present modification.

As illustrated in FIG. 9, a storage section 83 of the server device 80 of the present modification further includes a collision position storing section 833 which stores position information of an obstacle. A control section 81 of the server device 80 of the present modification further includes a position information obtaining section 815 (see FIG. 9). The position information obtaining section 815 receives, from the self-propelling electronic device 20, position information indicative of a position (relative position) of the self-propelling electronic device 20 at which position the self-propelling electronic device 20 collided with an obstacle. The position information obtaining section 815 then causes the collision position storing section 833 to store the position information.

A route searching section 813 of the server device 80 searches for a running route which does not include the position indicated by the position information stored in the collision position storing section 833 on which running route the self-propelling electronic device 20 runs at least once all divided regions which are (i) included in a running region included in layout information stored in a layout information storing section 831 and (ii) specified by a preferential running region specifying section 812.

An instruction issuing section 814 of the server device 80 creates a control instruction for causing the self-propelling electronic device 20 to run a space P along the running route which has been searched for by the route searching section 813. The instruction issuing section 814 then issues the created control instruction to the self-propelling electronic device 20. As such, the server device 80 instructs the self-propelling electronic device 20 to run the space P without colliding with the obstacle.

It is preferable that position information stored in the collision position storing section 833 be deletable by a user's operation. Specifically, a position indicated by the position information stored in the collision position storing section 833 is displayed on an interface screen, and a deletion operation is entered via the interface screen.

[Modification 5]

The above has described a case where the server device 80 searches for a running route which the self-propelling electronic device 20 runs while avoiding an obstacle. Alternatively, the self-propelling electronic device may be controlled itself to run while avoiding an obstacle.

Specifically, when the collision detecting sensor 41 detects a collision with an obstacle, the control section 21 of the self-propelling electronic device 20 controls the running driving section 61 so that the self-propelling electronic device 20 shifts to a point on a running route which point is located forward of the obstacle. After the self-propelling electronic device 20 shifts to the point, the control section 21 controls the running driving section 61 so that the self-propelling electronic device 20 keeps running along the running route. As such, the self-propelling electronic device 20 keeps running along the running route while avoiding the obstacle.

Note that it is preferable that the length of a route which the self-propelling electronic device 20 does not run to avoid an obstacle be shorter. It is preferable that the length of a running route extending from a first point to a second point be shorter, the first point being a point from which the self-propelling electronic device 20 shifts to the second point, and the second point being a point to which the self-propelling electronic device 20 shifts.

Figure 10:
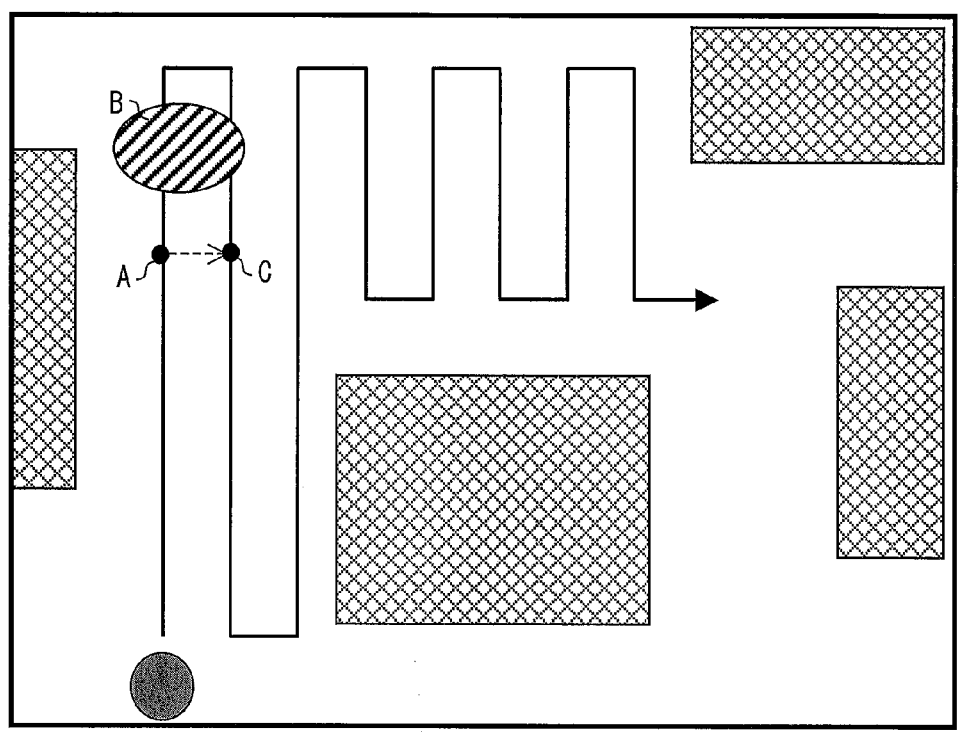
FIG. 10 is a diagram schematically illustrating a state where the self-propelling electronic device keeps running along a running route while avoiding obstacles.

The following description will discuss, with reference to FIG. 10, how the self-propelling electronic device 20 keeps running along a running route while avoiding an obstacle. In FIG. 10, an arrow line represents the running route, and an arrow of the arrow line represents a running direction of the self-propelling electronic device 20. Assume that the self-propelling electronic device 20 collides with an obstacle B at a point A. When the self-propelling electronic device 20 collides with the obstacle B at the point A, the self-propelling electronic device 20 shifts from the point A to a point C on the running route which point C is located forward of the obstacle B. This allows the self-propelling electronic device 20 to keep running along the running route while avoiding the obstacle B.

[Modification 6]

When the self-propelling electronic device 20 collides with an obstacle, the self-propelling electronic device 20 may stop running and return to a home position.

Specifically, when the collision detecting sensor 41 detects a collision with the obstacle, the control section 21 of the self-propelling electronic device 20 controls the running driving section 61 so that the self-propelling electronic device 20 shifts to the home position.

Note that the control section 21 of the self-propelling electronic device 20 is preferably configured to, when the self-propelling electronic device 20 has returned to the home position, notify at least one of the server device 80 and the communication terminal 10 that the self-propelling electronic device 20 has stopped running due to the collision with the obstacle and has returned to the home position. This configuration allows a user to be notified that the obstacle exists and the self-propelling electronic device 20 has stopped cleaning.

[Modification 7]

There is a case where one self-propelling electronic device 20 is shared in a plurality of spaces P such as a living room, a bed room, and a children's room. In this case, the device control system 100 is preferably configured to specify one of the plurality of spaces P which one the self-propelling electronic device 20 will run so that the server device 80 can accurately search for a running route.

Figure 11:
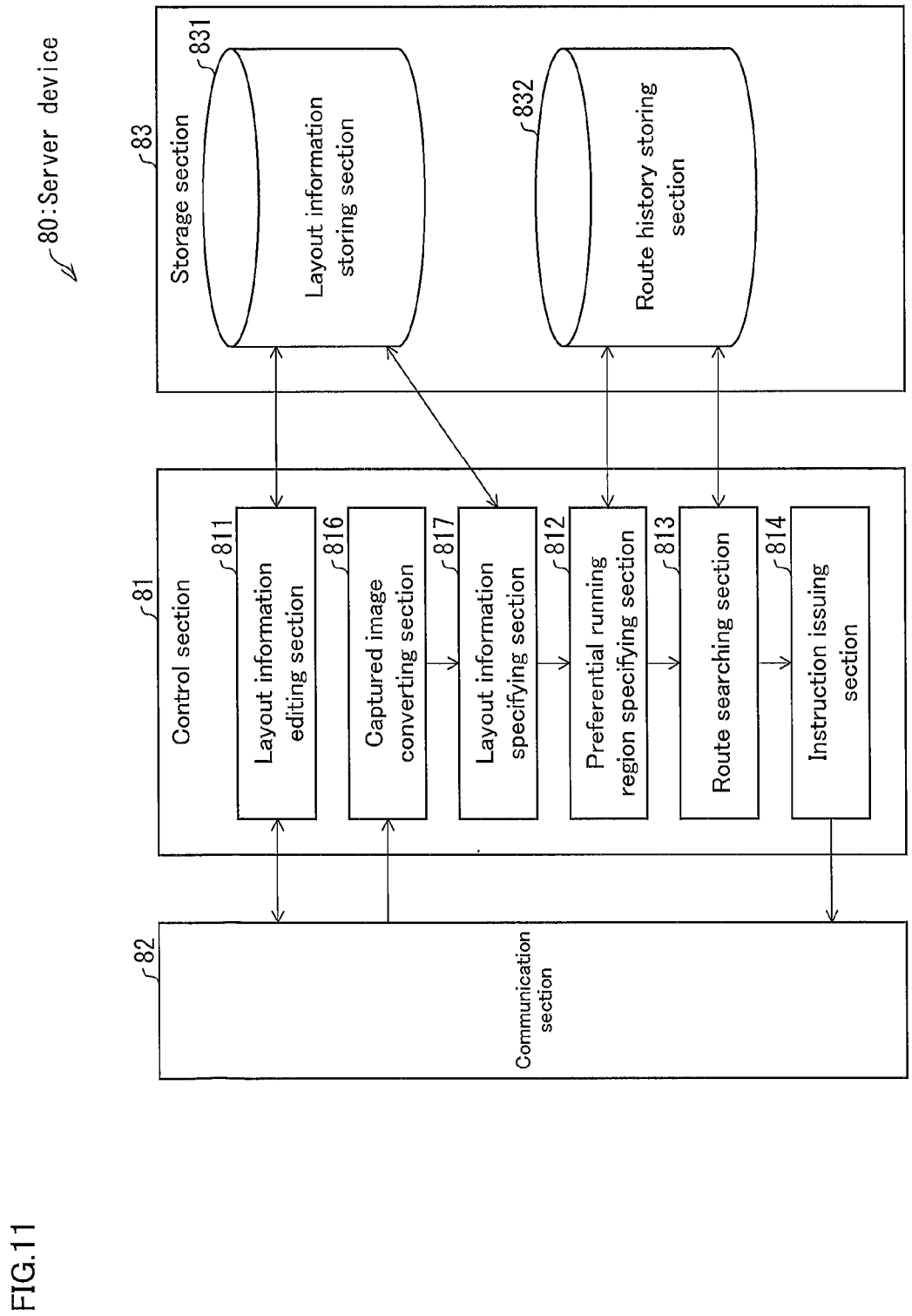
FIG. 11 is a block diagram illustrating a configuration of another modification of the server device included in the device control system illustrated in FIG. 2.

The following description will discuss, with reference to FIG. 11, a method of specifying a space P with an image captured by the image capturing section 40 of the self-propelling electronic device 20. FIG. 11 is a block diagram illustrating a configuration of a server device 80 of the present modification.

As illustrated in FIG. 11, a control section 81 of the server device 80 further includes a captured image converting section (layout information generating section) 816, and a layout information specifying section 817. Assume that layout information for each space P which the self-propelling electronic device 20 will run is stored in a layout information storing section 831 of the server device 80. The layout information is edited on an interface screen provided by a layout information editing section 811.

The captured image converting section 816 obtains at least one captured image of a space P where the self-propelling electronic device 20 is located, the at least one captured image being captured by the image capturing section 40 of the self-propelling electronic device 20. The captured image converting section 816 then presumes, from a feature of the at least one captured image, (i) the outline and size of a floor of the space P where the self-propelling electronic device 20 is located and (ii) a running region and a non-running region of the floor of the space P. The captured image converting section 816 generates layout information based on this presumption.

A method of presuming a layout of a space from a feature of a captured image is not particularly limited. A generally-known method may be employed as the method. The running region and the non-running region may be presumed from the position and size of an object whose image is captured in the captured image.

In order to improve presumption accuracy, it is preferable to capture a plurality of different images of the surroundings of the self-propelling electronic device 20, and to use features of the plurality of different images. It is further preferable that the self-propelling electronic device 20 capture images in different places within a space.

The layout information specifying section 817 extracts, from the layout information storing section 831, layout information most similar to the layout information generated by the captured image converting section 816. That is, the layout information specifying section 817 specifies layout information which is (i) stored in the layout information storing section 831 and (ii) indicative of a layout most similar to a layout indicated by the layout information generated by the captured image converting section 816.

The layout information specifying section 817 may extract the layout information most similar to the layout information by subjecting an image matching treatment to a layout image of the floor of the space P specified by the layout information generated by the captured image converting section 816. The image matching treatment is not particularly limited. A generally-known image matching treatment may be employed.

A route searching section 813 searches for a running route on which the self-propelling electronic device 20 runs at least once all divided regions which are (i) included in a running region included in the layout information specified by the layout information specifying section 817 and (ii) specified by a preferential running region specifying section 812. Processes after this process are the same as has been described.

[Software Implementation Example]

Each block of the communication terminal 10, the self-propelling electronic device 20 and the server device 80 of the present embodiment, particularly, the control section 11, the control section 21 and the control section 81 may be realized by a hardware such as a logic circuit on an integrated circuit (IC chip) or may be realized by software as executed by a CPU (Central Processing Unit).

In a case where the each block of the communication terminal 10, the self-propelling electronic device 20 and the server device 80 of the present embodiment, particularly, the control sections 11, 21 and 81 are realized by software as executed by a CPU, each of the communication terminal 10, the self-propelling electronic device 20 and the server device 80 includes: the CPU that executes instructions of a program that realizes each of the functions; a ROM (Read Only Memory) storing the program; and a RAM (Random Access Memory) that develops the program; and a storage device (storage medium) such as a memory which stores the program and various kinds of data. The object of the present invention can be achieved by mounting to each of the communication terminal 10, the self-propelling electronic device 20 and the server device 80 a computer-readable storage medium storing a program code of a control program (executable program, intermediate code program, or source program) for the each of the communication terminal 10, the self-propelling electronic device 20 and the server device 80, the control program being software for realizing the foregoing functions, so that the computer (or CPU or MPU) retrieves and executes the program code stored in the storage medium.

The storage medium can be a non-transitory tangible medium, for example, a tape, such as a magnetic tape or a cassette tape; a disk including (i) a magnetic disk such as a floppy (Registered Trademark) disk or a hard disk and (ii) an optical disk such as CD-ROM, MO, MD, DVD, or CD-R; a card such as an IC card (memory card) or an optical card; a semiconductor memory such as mask ROM, EPROM, EEPROM (Registered Trademark), or flash ROM; or a logic circuit such as PLD (Programmable logic device) or FPGA (Field Programmable Gate Array).

The communication terminal 10, the self-propelling electronic device 20 and the server device 80 can be arranged to be connectable to a communications network so that the program code is made available to the communication terminal 10, the self-propelling electronic device 20 and the server device 80 via the communications network. The communications network is not limited to a specific one provided that it can transfer the program code to the communication terminal 10, the self-propelling electronic device 20 and the server device 80, and therefore can be, for example, the Internet, Intranet, extranet, LAN, ISDN, VAN, CATV communications network, virtual dedicated network (virtual private network), telephone line network, mobile communications network, or satellite communications network. The transfer medium which constitutes the communications network is not limited to a specifically-configured transfer medium or a specific kind of transfer medium provided that it can transfer the program code to the communication terminal 10, the self-propelling electronic device 20 and the server device 80, and therefore can be, for example, wired line such as IEEE 1394, USB, electric power line, cable TV line, telephone line, or ADSL (Asymmetric Digital Subscriber Line); or wireless such as infrared radiation (IrDA or remote control), Bluetooth (Registered Trademark), IEEE 802.11 wireless, HDR (High Data Rate), NFC (Near Field Communication), DLNA (Digital Living Network Alliance) (Registered Trademark), mobile telephone network, satellite line, or terrestrial digital network. Note that the present invention can also be implemented by the program code in the form of a computer data signal embedded in a carrier wave which is embodied by electronic transmission.

[Summary]

A device controlling apparatus of an aspect of the present invention is configured to be a device controlling apparatus (server device 80) which controls running of a self-propelling electronic device (20) that runs at least one predetermined space, including: a running region information storing section (layout information storing section 831) which stores running region information indicative of a running region that represents a region which the self-propelling electronic device can run in the at least one predetermined space, the running region being determined by a user's operation; a route history storing section (832) which stores a history of a route which the self-propelling electronic device ran while carrying out a predetermined operation; a running region specifying section (preferential running region specifying section 812) which specifies, from a predetermined number of routes having been most recently stored in the route history storing section, a predetermined number of regions in the running region which predetermined number of regions the self-propelling electronic device has most recently run a fewest number or fewer numbers of times; a route searching section (route searching section 813) which searches for a running route on which the self-propelling electronic device runs at least once all of the predetermined number of regions in the running region indicated by the running region information stored in the running region information storing section, the predetermined number of regions being specified by the running region specifying section; and an instruction issuing section (instruction issuing section 814) which (i) creates a control instruction for causing the self-propelling electronic device to run and carry out the predetermined operation in the at least one predetermined space along the running route searched for by the route searching section, and (ii) issues the control instruction to the self-propelling electronic device.

According to the configuration, it is possible to (i) search for a running route which the self-propelling electronic device runs at least once all of a predetermined number of regions which the self-propelling electronic device has most recently run a fewest number or fewer numbers of times and (ii) cause the self-propelling electronic device to run a predetermined space along the running route and to carry out an operation. This brings about an effect of causing the self-propelling electronic device to efficiently carry out the operation in the predetermined space. Further, according to the configuration, it is possible to search for the running route with use of a running region determined by a user's operation. It is therefore possible to cause the self-propelling electronic device to preferentially run a region which (i) a user wants the self-propelling electronic device to run and (ii) the self-propelling electronic device has run less frequently.

The device controlling apparatus of the aspect of the present invention may further be configured so that the running region further includes at least one priority region designated by a user's operation as a region where the predetermined operation is carefully carried out, and the route searching section further searches for the running route on which the self-propelling electronic device runs all over the at least one priority region.

The configuration can cause the self-propelling electronic device to run all over the at least one priority region designated by a user and to carry out the predetermined operation.

The device controlling apparatus of the aspect of the present invention may further be configured so that whether or not the predetermined operation is carefully carried out in an appearance region is determined by a user's operation, the appearance region being a region which is newly included in the running region by changing the running region in accordance with a user's operation, and the route searching section further searches for the running route on which the self-propelling electronic device runs all over the appearance region in which it is determined that the predetermined operation is carefully carried out.

The configuration can cause the self-propelling electronic device to (i) run all over the appearance region in which it is determined that the predetermined operation is carefully carried out and (ii) carry out the predetermined operation.

The device controlling apparatus of the aspect of the present invention may further be configured so that the running region information storing section stores pieces of layout information for a respective plurality of predetermined spaces included in the at least predetermined space, each of the pieces of layout information including the running region information and being indicative of a layout of a corresponding one of the plurality of predetermined spaces, the self-propelling electronic device includes an image capturing section (40) which captures an image of surroundings of the self-propelling electronic device, the device controlling apparatus further includes: a layout information generating section (captured image converting section 816) which obtains the image captured by the image capturing section, presumes a layout of one of the plurality of predetermined spaces from a feature of the image thus obtained, and generates a piece of layout information indicative of the layout thus presumed; and a layout information specifying section (layout information specifying section 817) which specifies, from the pieces of layout information stored in the running region information storing section, a piece of layout information indicative of a layout most similar to the layout indicated by the piece of layout information generated by the layout information generating section, and the route searching section searches for a running route on which the self-propelling electronic device runs at least once all regions which are (i) included in the running region indicated by the running region information included in the piece of layout information specified by the layout information specifying section and (ii) specified by the running region specifying section.

According to the configuration, even in a case where there are a plurality of predetermined spaces which the self-propelling electric device is caused to run, it is possible to (i) automatically specify one of the plurality of predetermined spaces which one the self-propelling electric device intends to run and (ii) cause the self-propelling electric device to carry out an efficient operation in the specified predetermined space.

The device controlling apparatus of the aspect of the present invention may further be configured so that the self-propelling electric device is capable of finding a relative position of the self-propelling electric device which relative position is relative to a reference position in the at least one predetermined space, and the route searching section (i) is notified, by the self-propelling electric device, of the relative position at a time when the self-propelling electric device starts carrying out the predetermined operation, (ii) specifies, from the relative position thus notified and a position in the running region which position corresponds to the reference position, a position in the running region which position corresponds to a current position of the self-propelling electric device, and (iii) searches for the running route where the specified position is a start point.

The configuration can cause the self-propelling electric device to start running from the current position along the running route.

The device controlling apparatus of the aspect of the present invention may further be configured so that, when the route searching section receives, from the self-propelling electric device which is running in accordance with the control instruction, position information indicative of a position where the self-propelling electric device collided with an obstacle, the route searching section newly searches for a running route which does not include a position of the obstacle, and the instruction issuing section (i) creates a control instruction for causing the self-propelling electronic device to run the at least one predetermined space along the running route newly searched for by the route searching section and to carry out the predetermined operation, and (ii) issues the control instruction to the self-propelling electronic device.

The configuration can cause the self-propelling electronic device to run along a new running route which does not include a position of an obstacle with which the self-propelling electronic device collided during running.

The device controlling apparatus of the aspect of the present invention may further be configured so that the device controlling apparatus further includes a position information obtaining section (position information obtaining section 815) which (i) receives, from the self-propelling electric device which is running in accordance with the control instruction, position information indicative of a position where the self-propelling electric device collided with an obstacle, and (ii) causes a collision position storing section to store the position information, and the route searching section searches for a running route (i) on which the self-propelling electric device runs at least the all regions specified by the running region specifying section and (ii) which does not include the position indicated by the position information stored in the collision position storing section.

The configuration can cause the self-propelling electric device to run along a running route which does not include a position where an obstacle existed.

A self-propelling electronic device of an aspect of the present invention is configured to be a self-propelling electronic device which (i) receives a control instruction created by the device controlling apparatus and (ii) runs and carries out the predetermined operation in the at least one predetermined space in accordance with the control instruction.

The configuration brings about an effect of causing the self-propelling electronic device to (i) run a predetermined space along a running route on which the self-propelling electronic device runs at least once all of a predetermined number of regions which the self-propelling electronic device has most recently run a fewest number or fewer numbers of times and (ii) carry out an operation.

The self-propelling electronic device of the aspect of the present invention may further be configured to include: a collision detecting sensor (41) which detects a collision with an obstacle; and a control section (control section 21) which, when the collision detecting sensor detects the collision with the obstacle while the self-propelling electronic device is running in accordance with the control instruction, controls the self-propelling electronic device to shift to a point on the running route which point is located forward of the obstacle.

According to the configuration, when the collision with the obstacle is detected, the self-propelling electronic device is controlled to shift to the point on the running route which point is located forward of the obstacle. This allows the self-propelling electronic device to keep running along the running route.

The self-propelling electronic device of the aspect of the present invention may further be configured to include: a collision detecting sensor which detects a collision with an obstacle; and a control section which, when the collision detecting sensor detects the collision with the obstacle while the self-propelling electronic device is running in accordance with the control instruction, controls the self-propelling electronic device to shift to a reference position in the at least one predetermined space.

According to the configuration, when the collision with the obstacle is detected, the self-propelling electronic device can stop running and return to the reference position.

The self-propelling electronic device of the aspect of the present invention may further be configured so that, when the self-propelling electronic device completes shifting to the reference position, the control section notifies the outside that the self-propelling electronic device has stopped running due to a collision with an obstacle.

The configuration makes it possible to notify an external device that the self-propelling electronic device has stopped running and has returned to the reference position.

Note that each of the device controlling apparatus and the self-propelling electronic device may be realized by a computer. In this case, the scope of the present invention encompasses (i) a control program of each of the device controlling apparatus and the self-propelling electronic device for causing the computer to realize each of the functions and (ii) a computer-readable storage medium in which the control program is stored.

The scope of the present invention further encompasses a device control system which includes the device controlling apparatus and the self-propelling electronic device.

The present invention is not limited to the description of the above embodiment, and can therefore be modified by a skilled person in the art within the scope of the claims. Namely, an embodiment derived from a proper combination of technical means disclosed in different embodiments is encompassed in the technical scope of the present invention. Moreover, it is possible to obtain a new technical feature from a proper combination of technical means disclosed in different embodiments.

INDUSTRIAL APPLICABILITY

The present invention is applicable to, for example, a device controlling apparatus which controls running of a self-propelling electronic device. The present invention is suitably applicable to, particularly, a device controlling apparatus which controls running of a self-propelling electronic device which cleans a predetermined space.

REFERENCE SIGNS LIST

10: Communication terminal
13: Display section
20: Self-propelling electronic device
21: Control section
40: Image capturing section
41: Collision detecting sensor
80: Server device (device controlling apparatus)
100: Device control system
811: Layout information editing section
812: Preferential running region specifying section (running region specifying section)
813: Route searching section
814: Instruction issuing section
815: Position information obtaining section
816: Captured image converting section (layout information generating section)
817: Layout information specifying section
831: Layout information storing section (running region information storing section)
832: Route history storing section
833: Collision position storing section
F: Priority region
N: Appearance region
P: Space

The invention claimed is:

1. A device controlling apparatus which controls running of a self-propelling electronic device that runs at least one predetermined space, comprising:
   a running region information storing section which stores running region information indicative of a running region that represents a region which the self-propelling electronic device can run in the at least one predetermined space, the running region being determined by a user's operation;
   a route history storing section which stores a history of a route which the self-propelling electronic device ran while carrying out a predetermined operation;
   a running region specifying section which specifies, from a predetermined number of routes having been most recently stored in the route history storing section, a predetermined number of regions in the running region which predetermined number of regions the self-propelling electronic device has most recently run a fewest number or fewer numbers of times;
   a route searching section which searches for a running route on which the self-propelling electronic device runs at least once all of the predetermined number of regions in the running region indicated by the running region information stored in the running region information storing section, the predetermined number of regions being specified by the running region specifying section; and
   an instruction issuing section which (i) creates a control instruction for causing the self-propelling electronic device to run and carry out the predetermined operation in the at least one predetermined space along the running route searched for by the route searching section, and (ii) issues the control instruction to the self-propelling electronic device.

2. The device controlling apparatus as set forth in claim 1, wherein the running region further includes at least one priority region designated by a user's operation as a region where the predetermined operation is carefully carried out, and
   the route searching section further searches for the running route on which the self-propelling electronic device runs all over the at least one priority region.

3. The device controlling apparatus as set forth in claim 1, wherein whether or not the predetermined operation is carefully carried out in an appearance region is determined by a user's operation, the appearance region being a region which is newly included in the running region by changing the running region in accordance with a user's operation, and
   the route searching section further searches for the running route on which the self-propelling electronic device runs all over the appearance region in which it is determined that the predetermined operation is carefully carried out.

4. The device controlling apparatus as set forth in claim 1, wherein the self-propelling electronic device includes an image capturing section which captures an image of surroundings of the self-propelling electronic device,
   the running region information storing section stores pieces of layout information for a respective plurality of predetermined spaces included in the at least predetermined space, each of the pieces of layout information including the running region information and being indicative of a layout of a corresponding one of the plurality of predetermined spaces, the device controlling apparatus further comprises:
- a layout information generating section which obtains the image captured by the image capturing section, presumes a layout of one of the plurality of predetermined spaces from a feature of the image thus obtained, and generates a piece of layout information indicative of the layout thus presumed; and
- a layout information specifying section which specifies, from the pieces of layout information stored in the running region information storing section, a piece of layout information indicative of a layout most similar to the layout indicated by the piece of layout information generated by the layout information generating section, and the route searching section searches for a running route on which the self-propelling electronic device runs at least once all regions which are (i) included in the running region indicated by the running region information included in the piece of layout information specified by the layout information specifying section and (ii) specified by the running region specifying section.

5. A self-propelling electronic device which (i) receives a control instruction created by a device controlling apparatus as set forth in claim 1 and (ii) runs and carries out the predetermined operation in the at least one predetermined space in accordance with the control instruction.

* * * * *